United States Patent

[11] 3,597,746

[72] Inventor Francis Leighton Burnham
Silver Spring, Md.

[21] Appl. No. 779,984
[22] Filed Nov. 29, 1968
[45] Patented Aug. 3, 1971
[73] Assignee The Bunker-Ramo Corporation
Canoga Park, Calif.

[54] INFORMATION PROCESSING DEVICE
12 Claims, 1 Drawing Fig.

[52] U.S. Cl. 340/173 RC, 340/173 R, 325/17
[51] Int. Cl. G11c 27/00, H04b 1/40, H04b 7/14
[50] Field of Search 340/173 RC, 173; 235/151; 325/2, 7, 8, 9, 10, 17, 25; 343/6.8, 7.5, 179

[56] References Cited

UNITED STATES PATENTS 2,820,138 1/1958 Haard 325/7
3,059,187 10/1962 Jaffe 331/14 X
3,165,721 1/1965 Kennedy 340/173
3,218,561 11/1965 Moeller 340/173 X

*Primary Examiner*—Terrell W. Fears
*Assistant Examiner*—Stuart Hecker
*Attorney*—Frederick M. Arbuckle

ABSTRACT: An information processing device having a means for applying information to the device in a first form, such as frequency, and a means for converting the information into a second form, such as an analog voltage, in which form it is desired to store the information. Means are provided for storing the information in its second form. At a selected time after the information is stored, it is applied through a reconverting means, such as a VCO, to restore it to its original form for utilization. The output from the reconverting means is fed back through the same converting means as was used in the input operation. The feedback signal is utilized to control the input to the reconverting means. This feedback operation has the effect of compensating for any errors in the converting and reconverting operations.

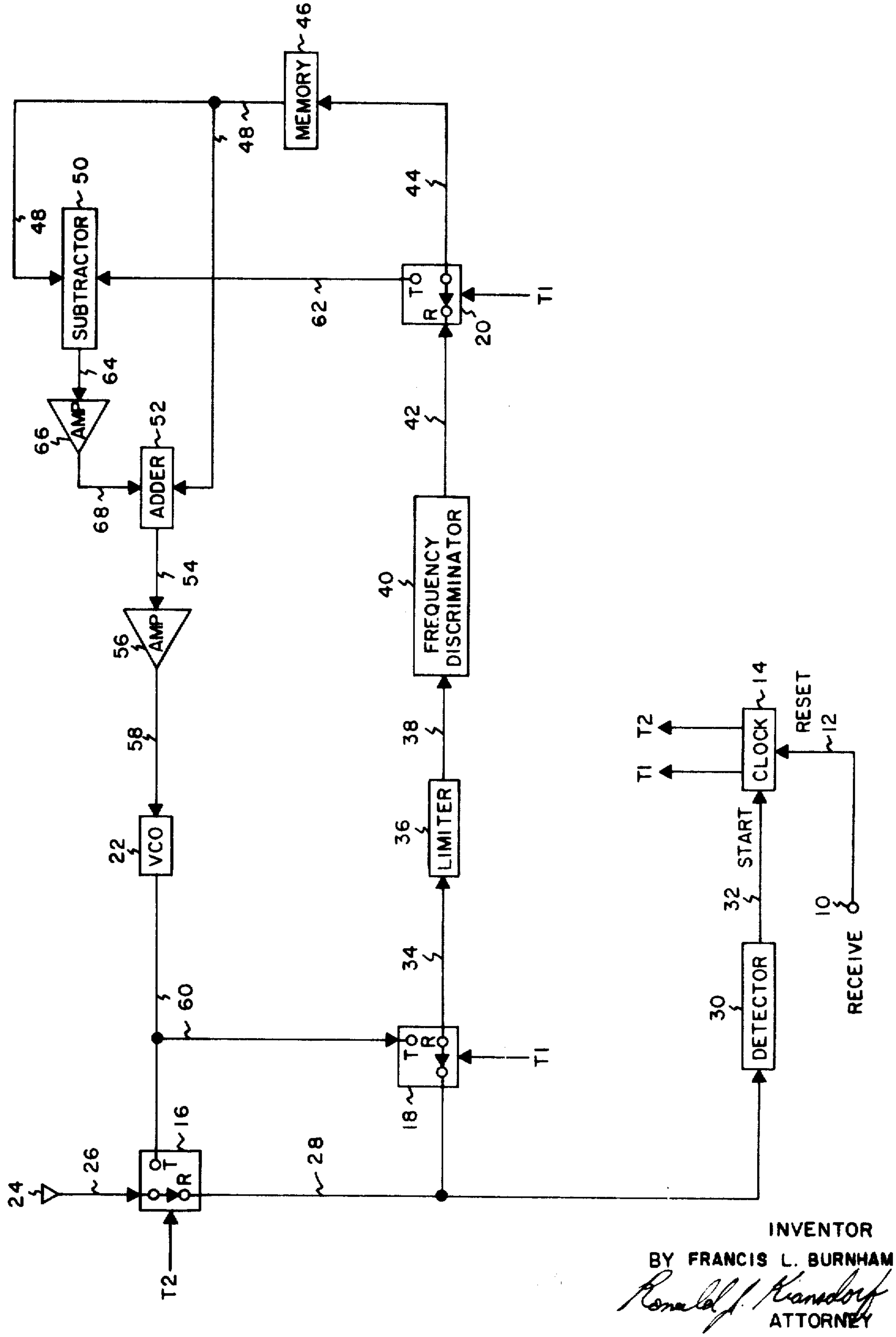
INVENTOR
BY FRANCIS L. BURNHAM
Ronald J. Kransdorf
ATTORNEY

INFORMATION PROCESSING DEVICE

This invention relates to a device for processing information which is received in a form not suitable for storage and more particularly to a device which permits such information to be rapidly converted to a form suitable for storage, and then reconverted to its initial form with a high degree of accuracy.

Situations frequently arise where information which is not in a form suitable for storage is either momentarily present, or momentarily sampled, and is then to be used for some purpose. In order to be used, this information must be converted to a form suitable for storage, stored, and then reconverted to its initial form for utilization. In one application in which this sequence of operations is performed, an input signal of unknown frequency is detected and converted by a frequency discriminator into an analog voltage which is then stored. The stored analog voltage is then utilized to control the frequency of a voltage controlled oscillator (VCO) which generates an output at the same frequency as the detected input.

In an open loop system of the type described above the output frequency frequently differs significantly from the detected input frequency due primarily to mismatch between the frequency discriminator and the VCO. The simple open loop system described above is therefore suitable only for applications where a relatively large frequency error can be tolerated. Higher accuracy can be achieved by use of a closed loop system such as a phase-locked loop. However, such systems require either that the input pulse be of sufficient duration to permit the feedback operation to be completed or that a number of pulses be sampled. There are applications where frequency lock-on must be achieved on a single extremely short pulse. A need therefore exists for a device which is capable of operating on a single, relatively short pulse while still providing extremely high accuracy in frequency matching.

It is therefore a primary object of this invention to provide an improved device for detecting information received in a first form which is not suitable for storage, converting the information to a form suitable for storage, and then reconverting the information back to its original form.

A more specific object of this invention is to provide a device of the type described above which is capable of providing a high level of output accuracy while operating on a single relatively short piece of information.

A still more specific object of this invention is to provide a device of the type described above wherein the input information is in the form of a frequency pulse while the stored information is in the form of an analog voltage.

In accordance with the above objects this invention provides an information processing device which includes means for applying information to the device in a first form, such as frequency, which form is not suitable for storage. This information is converted into second form, such as an analog voltage, in a suitable converting means such as a frequency discriminator, and is stored in its second form. At a selected time after the information is stored, it is applied through a reconverting means, such as a VCO, to restore it to its original form for utilization. The output from the reconverting means is fed back through the same converting means as was used in the input operation. The feedback signal is utilized to control the input to the reconverting means. This feedback operation has the effect of compensating for any errors in the converting and reconverting operations thereby minimizing frequency errors in the output.

The foregoing and other objects, features and advantages of the invention will be apparent in the following more particular description of a preferred embodiment of the invention as illustrated in the accompanying drawing.

The single FIGURE is a schematic block diagram of a preferred embodiment of the invention.

Referring now to the FIGURE, assume initially that a signal has been applied, either under automatic or manual control, to receive terminal 10 causing a reset signal to be applied through line 12 to clock 14. This terminates any signal which may appear on the T1 and T2 clock lines permitting switches 16, 18 and 20 to be set to their receive or R position as shown in the FIGURE. For purposes of the following discussion it will be assumed that each of the switches 16, 18, and 20 is of a type which is normally set to the R or receive position and which is transferred to the T or transmit position when a clock input is present on the appropriate clock line. These switches could for example be simple relay or reed switches or more complicated electronic devices. Voltage controlled oscillator (VCO) 22 may also be biased off when the circuit is operating in its receive mode.

When a suitable pulse is received at antenna 24, a signal is passed through line 26, switch 16, and line 28 to detector 30. On detecting a suitable pulse, detector 30 generates an output on line 32 which is applied to start clock 14 running.

The signal on line 28 is also applied through switch 18, line 34, limiter 36, and line 38 to the input of frequency discriminator 40. Limiter 36, which may for example be a tunnel diode limiter, provides a nearly constant amplitude signal at the input to the frequency discriminator. Frequency discriminator 40, which should also be of the limiting type, generates an output signal on line 42 the peak amplitude of which is proportional to the frequency of the applied input. Limiter 36 and the limiting effect in discriminator 40 assures that the amplitude of the output pulse on line 42 is dependent only upon the carrier frequency of the input pulse. The peak value of the output from discriminator 40 on line 42 is passed through switch 20 and line 44 to be stored in analog memory 46. Memory 46 may, for example, be a capacitor storage element.

When a sufficient period of time has passed after the detection of the input pulse for the storage of the analog value in memory 46 to be completed, clock 14 generates an output signal on the T1 clock line which causes switches 18 and 20 to transfer to their T position. If VCO 22 was biased off when the system was set to its receive mode, the signal on the T1 line is also effective to turn the VCO on. The circuit is now set to operate in a closed loop mode with the VCO output being fed back to control its input. Thus the analog voltage level in memory 46 is applied through line 48 as one input to subtractor 50 and as one input to adder 52. The output from adder 52 is applied through line 54, amplifier 56, and line 58 to the input of VCO 22. The amplitude level in memory 46 is thus applied to control the frequency output from VCO 22. This output is applied through line 60, switch 18, which is now set in its T position, limiter-discriminator combination 36—40, switch 20, which is also now set to its T position, and line 62 to the other input of subtractor 50. The output from subtractor 50 on line 64 is thus an error signal which may, for example, result from a mismatch between VCO 22 and frequency discriminator 40. This error signal is amplified in amplifier 66 and applied through line 68 to the other input of adder 52. The input to VCO 22 is thus modified to compensate for any error in its output. When a sufficient period of time has passed for the feedback loop described above to stabilize the output from VCO 22 on line 60 at the proper frequency, clock 14 generates a second output on its T2 line which is applied to transfer switch 16 to its T or transmit position. The signal on line 60 is thus applied through line 26 to antenna 24. The frequency output from antenna 24 may be utilized for any desired purpose.

It is thus seen that a circuit has been provided which can accept a single, short-duration input pulse of a given frequency and generate an output signal which very accurately matches the frequency of the received pulse. This capability is achieved by use of an open-loop receive mode and a closed-loop transmit mode, with the same frequency discriminator being utilized both for the receive mode and in the feedback loop for the transmit mode. Any error in the frequency discriminator itself is thus compensated for by the double utilization of this component and any mismatch between the frequency discriminator and the VCO is compensated for by the feedback loop. A high degree of frequency accuracy is thus obtainable.

It should at this point be mentioned that, while the above discussion has assumed short-duration pulse inputs or short samples on pulse or continuous-wave signals, this is by no means a limitation on the invention. The circuit will perform at least as well with longer duration inputs.

The error cancelling capability of the circuit shown in the FIGURE may be illustrated mathematically by noting that the transfer function for the circuit is $$\frac{Fo(s)}{Fi(s)}=\frac{KH_1(s)G(s)}{1+KH_2(s)G(s)} \quad (1)$$

where:

$Fi(s)$ = input frequency, where $(s)$ is a complex variable $Fo(s)$ = output frequency $G(s)$ = transfer function of the VCO network $H(s)_1$ = transfer function of the limiter-discriminator when operating in the receive mode *(Mode 1)

$H(s)_2$ = transfer function of the limiter-discriminator when operating in the transmit mode (Mode 2).

K = forward-loop gain of the system. If the forward-loop gain of the system (K) is very large, equation (1) reduces very nearly to $$\frac{Fo(s)}{Fi(s)}\simeq\frac{KG(s)H_1(s)}{KG(s)H_2(s)}=\frac{H_1(s)}{H_2(s)} \quad (2)$$

Since the same limiter-discriminator combination is being used both in mode 1 and mode 2, $H_1(s)$ and $H_2(s)$ are equal. Thus, the desired transfer function $$(Fo(s)/F1(s)=1 \quad (3)$$

is obtained. It is thus seen that when the forward-loop gain of the system is large, the feedback operation will compensate for mismatch errors, while the double use of a distortion-causing component, such as the limiter-discriminator combination, in an inverse manner, causes the distortion of this component to become self-cancelling. The total distortion of the system therefore approaches zero resulting in a system transfer function approaching one.

While an adder 52 has been shown in the preferred embodiment of the invention, the signal on line 68 may be applied directly to control VCO 22 if the gain in amplifier 66 is sufficiently high. When the circuit is constructed in this manner, the desired output frequency is achieved through normal servo operation. Also, if VCO 22 is turned off when the system is in the receive mode, then switch 20 may be dispensed with and line 42 connected directly to both memory 46 and subtractor 50. Another possible modification would be to connect line 60 to switches 16 and 18 through a voltage divider or similar coupler so that only a portion of the output signal is fed back through limiter-discriminator combination 36—40. In some applications it ma be desirable to provide for operator control of the device by substituting manually controlled switches 16, 18 and 20 in place of the automatic switches shown. In applications of this type, where automatic mode changing is not required, clock 14 and detector 30 may be eliminated. Applications may also exist where a plurality of outputs are simultaneously required. A substantial saving in hardware may be effected in applications of this type by providing a plurality of VCOs 22, each associated with a corresponding signal emitter 24. An additional memory element would be connected between amplifier 56 and each of the VCOs. The system would then operate in the manner indicated above to store a value in memory 46 in an open-loop mode and to then establish a required input level on line 58 for the VCO in a closed-loop mode. This established voltage level would be stored in the additional memory element. The remainder of the circuit, including all elements except the additional memory element, VCO 22, and the output emitter 24, may then be disconnected from this memory-VCO combination and connected to a new memory-VCO combination. The original memory VCO combination will continue to generate the desired output in an open loop mode under control of the value stored in the memory element. By thus multiplexing hardware, a plurality of outputs may be obtained with a minimum of hardware. It is also apparent that the particular components described for the various elements in the FIGURE are for purposes of illustration only and that other components capable of performing the desired functions might be utilized. Similarly, a digital or other memory may be substituted for analog memory 46 if suitable modifications are made in the elements 22 and 40 and some other, nonstorable, parameter of the input signal, such as pulse width or pulse rise time, may, with suitable modifications in the elements 22 and 40, be used as the detected and output parameter. In the latter instance some modification in input source 24 may also be required.

While the invention has been particularly shown and described with reference to a preferred embodiment thereof, it will be understood by those skilled in the art that the foregoing and other changes in form and detail may be made therein without departing from the spirit and scope of the invention.

What I claim is:

1. An information processing device comprising:
means for applying information to said device in a first form;
means for converting said information to a second form in which it is desired to store the information;
means for storing the information in said second form;
means operative at a time after said information is stored for reconverting said stored information to said first form for utilization;
means for feeding back at least a portion of the output from said reconverting means through said converting means;
means for utilizing the feedback output from said converting means to generate an error signal;
and means responsive to said error signal for controlling the input to said reconverting means, whereby any error in said converting and reconverting means may be compensated for.

2. A device of the type described in claim 1 wherein the information in said first form is a frequency value; and
wherein said second form is an analog voltage.

3. A device of the type described in claim 2 wherein said converting means is a frequency discriminator; and
wherein said reconverting means is a voltage controlled oscillator.

4. A device of the type described in claim 3 wherein said converting means includes limiting means for assuring that the output level from said frequency discriminator is proportional only to the frequency of the information applied to said device.

5. A device of the type described in claim 2 wherein said storing means is an analog memory.

6. A device of the type described in claim 3 wherein said error signal generating means includes a subtractor, the output from which is utilized to control said voltage controlled oscillator;
means for applying the output from said storing means to one input of said subtractor; and
means for applying the feedback output from the frequency discriminator to the other input of said subtractor.

7. A device of the type described in claim 6 wherein the means responsive to the error signal includes an adder, the output from which is applied to control said voltage controlled oscillator;
means for applying the output from said memory to one input of said adder; and
means for applying the output from said subtractor to the other input of said adder.

8. A device of the type described in claim 1 including switching means operative when in a first mode for connecting said converting means to receive said applied information and to pass its output to said storing means, and operative when in a second mode for connecting said converting means in the feedback path from the output of said reconverting means to its input; and means operative at said time after the information is stored for switching said switching means from the first mode to the second mode.

9. A device of the type described in claim 1 including means for detecting when information has been applied to said device in said first form; and means operative at a selected time after said information is received for initiating said reconverting operation.

10. A device of the type described in claim 9 wherein said reconverting initiating means includes means operative at said selected time for switching said converting means from a position in which it is operative to accept said applied information and to pass its output to said storing means to a position in which it is operative to connect said converting means in the feedback path from the output of said reconverting means to its input.

11. An information processing device comprising:

means for receiving information in a first form;

means operative in an open-loop mode for storing said applied information in a second form said means including at least one distortion causing element; and means operative in a closed-loop mode for utilizing said stored information to generate an output in said first form which accurately matches said applied information, said means including means for utilizing said distortion causing element in said closed-loop mode to generate a distortion indicating signal, and means for utilizing said signal to compensate for the distortion introduced by said distortion causing element in the open-loop mode.

12. An information processing device comprising:

means for passing applied information through a first element having a fist predetermined transfer function;

means for storing the output from said first element; and means for applying the contents of said storing means to a second element having a second predetermined transfer function, said second transfer function being effectively the inverse of said first transfer function, said second element including means for utilizing said first element to generate a distortion indicating signal, and means for utilizing said signal to compensate for distortion introduced by said first element when storing information whereby distortion caused by said first element is self-cancelling in the transfer function of said device.